US010268845B2

(12) United States Patent
Nerot (10) Patent No.: US 10,268,845 B2
(45) Date of Patent: Apr. 23, 2019

(54) SECURING OF THE LOADING OF DATA INTO A NONVOLATILE MEMORY OF A SECURE ELEMENT (71) Applicant: OBERTHUR TECHNOLOGIES, Colombes (FR)

(72) Inventor: Sebastien Nerot, Colombes (FR)

(73) Assignee: IDEMIA FRANCE, Colombes (FR)

( * ) Notice: Subject to any disclaimer, the term of this patent is extended or adjusted under 35 U.S.C. 154(b) by 4 days.

(21) Appl. No.: 15/128,512

(22) PCT Filed: Mar. 25, 2015

(86) PCT No.: PCT/FR2015/050758
§ 371 (c)(1),
(2) Date: Sep. 23, 2016

(87) PCT Pub. No.: WO2015/145071
PCT Pub. Date: Oct. 1, 2015

(65) Prior Publication Data
US 2017/0109546 A1    Apr. 20, 2017

(30) Foreign Application Priority Data
Mar. 25, 2014  (FR) ...................... 14 52519

(51) Int. Cl.
G06F 21/77         (2013.01)
G06F 21/51         (2013.01)
(Continued)

(52) U.S. Cl.
CPC .............. G06F 21/77 (2013.01); G06F 21/51 (2013.01); G06F 21/57 (2013.01); G06F 21/64 (2013.01); H04W 8/245 (2013.01)

(58) Field of Classification Search
CPC .......... G06F 21/77; G06F 21/51; G06F 21/57; G06F 21/64
See application file for complete search history.

(56) References Cited

U.S. PATENT DOCUMENTS 6,233,683 B1    5/2001  Chan et al.
8,239,686 B1    8/2012  Hodzic et al.
(Continued)

FOREIGN PATENT DOCUMENTS

FR          2 993 682 A1    1/2014

OTHER PUBLICATIONS

International Search Report, dated Jun. 22, 2015, from corresponding PCT application.

Primary Examiner — Oleg Korsak
(74) Attorney, Agent, or Firm — Young & Thompson (57) ABSTRACT The securing of data loading originating from an external device into a code memory area defined by an initial program of the secure element and any modification of which is controlled solely by the latter. When the external device obtains data to be transmitted to the secure element, the latter simulates an image of the code memory area as it would be modified by the loading of these data. A signature is calculated on the basis of the simulated image, then dispatched to the secure element with the data. The initial program of the secure element compares a signature that it has calculated over the whole of the code memory area after the actual loading of the data, with the signature received from the external device. The identity between these signatures ensures that the code memory area conforms to the image simulated by the external device, and is unimpaired.

20 Claims, 2 Drawing Sheets (51) Int. Cl.
*G06F 21/57* (2013.01)
*G06F 21/64* (2013.01)
*H04W 8/24* (2009.01)

(56) References Cited

U.S. PATENT DOCUMENTS

| | | |
|---|---|---|
| 2012/0246442 A1 | 9/2012 | Dolgunov et al. |
| 2012/0324446 A1* | 12/2012 | Fries ........................ G06F 21/64 718/1 |
| 2014/0025940 A1 | 1/2014 | Giraud et al. |

* cited by examiner

US 10,268,845 B2

SECURING OF THE LOADING OF DATA INTO A NONVOLATILE MEMORY OF A SECURE ELEMENT

TECHNICAL FIELD

The invention relates to the field of secure elements such as smart cards. In particular, the invention provides methods and devices for securing the loading of data into a nonvolatile memory of a secure element.

BACKGROUND OF THE INVENTION

A secure element, for example a smart card, typically takes the form of a microcircuit integrated in a removable way into a host electronic device, or, in a variant, embedded (by soldering, for example) in an electronic device. By way of example, a secure element may be an eSE ("embedded secure element") or an eUICC ("embedded Universal Integrated Circuit Card").

A secure element comprises a processor which is specific to it, being different from the processor of the host electronic device in which it is integrated or embedded, and comprises a nonvolatile memory for storing computer programs that can be executed by the processor.

A non-modifiable area of the nonvolatile memory stores what is known as an "initial" or "base" program, usually of small size, for example a boot program (known as a "boot loader") stored by the manufacturer of the secure element. The initial program provides functionality enabling an intermediary such as an operator or a supplier of secure elements to users to customize the secure element, by loading software elements, usually consisting of compiled or interpreted code (that is to say, code words or "bytecodes" in machine language or code, directly executable by a processor), such as an operating system or applications, into a special area of the nonvolatile memory defined by the initial program. This initial program is, for example, associated with a particular operating system comprising, notably, a port control module for communication with this initial program, a memory update control module, a command interpreter, and security modules for securing this initial program. This particular operating system is customized by the manufacturer of the secure element, and no modification of the system is permitted after customization.

As a general rule, this initial program is the first program executed when the secure element is started, that is to say before any other program which may be present in the memory of the secure element. This program is essential for the execution of other programs in the secure element.

The aforesaid special area of the nonvolatile memory is entirely controlled by the initial program, which is the only program that can modify the boundaries of the special area or its content.

More precisely, these boundaries may be stored in registers of the initial program, or alternatively may be the result of the execution by the initial program of commands defining them. In all cases, the definition and any modification of the boundaries can only be the result of an action of the initial program.

Furthermore, only the initial program can activate (or deactivate) the special area for the purpose of enabling (or prohibiting) the execution of its content.

The aforesaid area is normally used for storing compiled or interpreted code, and will therefore be referred to hereafter as the "code storage area". It is particularly important that the code storage area should not be modified during the execution of the software elements that it contains, in order to ensure the integrity of the applications and operating system used by these software elements in the secure element.

During the life of the secure element, other software elements may be loaded into the code storage area. These may be, for example, a new version of a software element already stored (an update of the software element) or new data. In order to ensure the integrity and legitimacy of these software elements subsequently loaded into the code storage area, verification mechanisms are used, typically by the initial program, before activation, that is to say before enabling execution.

For example, the document FR 2 993 682 describes a boot program executed when the secure element is started up, enabling the code of a new version of an operating system to be obtained from an updating device when the installed operating system becomes obsolete. The integrity of the code of this new version of the operating system is verified by the boot program, one code block at a time, and as a whole, before the activation of the new version of the operating system is enabled.

However, the integrity verification only relates to newly received and loaded software elements.

Thus, a software element of the malicious type (known as "malware"), stored in the code storage area by a malicious party before the loading of a new software element, is not detected by the boot program during this integrity verification, because the boot program only relates to the newly loaded software element. Consequently there is a lapse in security.

There is also a lapse in security if a malicious party modifies or damages, by laser attack for example, a software element already stored in this code storage area. This is because the integrity verification performed on newly loaded software elements cannot reveal this modification or damage to the content of the code storage area.

Thus there is a need to improve the control of the securing of the secure element, and notably of the integrity of the software elements when data are loaded into this storage area.

SUMMARY OF THE INVENTION

Accordingly, the object of the present invention is to overcome at least one of these drawbacks.

In this context, a first aspect of the invention concerns a method of securing the loading of data into a nonvolatile memory of a secure element, said nonvolatile memory comprising a storage area, called the code storage area, defined by an initial program of the secure element, any modification of which area is controlled solely by said initial program, said method comprising the following steps executed by a device external to the secure element:
  obtaining data to be transmitted to the secure element;
  simulating an image of the code storage area modified by the loading of the data obtained into this code storage area of the secure element;
  calculating a signature of the simulated image of the code storage area as a whole; and
  transmitting the data obtained and the calculated signature to said secure element.

Additionally, a second aspect of the invention concerns a method of securing the loading of data into a nonvolatile memory of a secure element, said nonvolatile memory comprising a storage area, called the code storage area, defined by an initial program of the secure element, any modification of which area is controlled solely by said initial program, said method comprising the following steps executed by the secure element:

receiving data and a signature from an external device;

loading the data received from the external device into a part of the code storage area;

calculating a signature of the whole code storage area after the data have been loaded; and verifying the calculated signature, using the received signature, in order to enable the execution of the content of the code storage area solely if these two signatures are identical.

Thus the invention can be used to check the integrity of the data loaded into the secure element, as well as the integrity of the code storage area after the loading of these data, which occupy only a part of this storage area.

This advantage is obtained by calculating a signature based on a simulation of the image of the storage area as a whole, as it would be as a result of the loading of the data in full, instead of considering only the loaded data as in the prior art.

Thus the external device simulates the location and value of each of the bits of the code storage area, as it would or would not be modified by the loading of the data to be loaded.

Any code which is unexpected, because of its value and/or its location in the code storage area, can then be detected within the code storage area, since its presence creates a difference between the signature calculated over the image simulated in the external device and the signature calculated by the secure element itself in the storage area after the data loading has taken place.

Thus, if there is any difference between the signature calculated by the device on the basis of a simulated image of the code storage area corresponding to a memory state after the loading of the data and the signature of the code storage area after the loading of these various data has taken place, the activation of the code storage area, that is to say the execution of its contents, and therefore, in particular, the data loaded into the secure element, is rendered impossible (i.e. prohibited). Thus the loading of the data for their execution is secured.

The invention can therefore be used to detect when a piece of compiled or interpreted code (or unexpected data more generally) has been stored in an unexpected location in the code storage area, or does not have the expected value.

For example, the presence of a malicious software element, or modification or damage to a software element already in memory after the data loading, is detected by the initial program of the secure element during the verification of the signature calculated over the whole of the storage area obtained after said loading, using the provisional signature received from the external device.

Other characteristics according to embodiments of the invention are described in the dependent claims.

In specific embodiments of the invention, said data are transmitted to the secure element in response to a request to obtain data, and the request to obtain comprises information identifying the secure element.

In specific embodiments of the invention, said data are transmitted to the secure element in response to a request to obtain data, and the request to obtain data comprises a unique identifier of software configuration representative of a current image of the code storage area of the secure element.

Thus the external device is able to recover this current image and efficiently simulate the image of the memory modified by the data loading. This is because the current arrangement and value of the bits of the code storage area can be known precisely.

In specific embodiments of the invention, the signature is transmitted to the secure element with a request for activation (i.e. a request to enable execution) of the data obtained, in an encrypted command sent from the external device.

This arrangement secures the execution enabling process, because the request for activation and the signature required for verification before activation (i.e. before execution is enabled) are jointly protected.

It should be noted that the activation may be performed immediately after the positive verification of the signatures, or may take place later, for example on the next start-up of the secure element. This later activation makes it possible to avoid interrupting the operation of the secure element, notably if the data in question correspond to an update of its operating system or part of this system.

Alternatively, the activation could be automatically executed by the initial program without receiving an activation request. The activation relates to any data that may be asked for by a request, or to the code storage area as a whole.

In this alternative, the signature remains encrypted by the external device for transmission to the secure element.

In specific embodiments of the invention, the data obtained are transmitted by the electronic device with an indication of a location or locations in the code storage area into which the data obtained are to be loaded.

The location of each bit of the code storage area is therefore defined by the external device, thus ensuring that the secure element will carry out a loading of the data identical to that which the external device has simulated in the light of these supplementary indications. The signature obtained on the basis of the simulated image is therefore necessarily identical to that which the initial program of the secure element has to calculate after the loading of said data.

In specific embodiments of the invention, the code storage area is partitioned into P sub-areas, and the step of calculating the signature comprises obtaining an elementary signature for each sub-area and obtaining the signature for the whole code storage area, whether simulated or not, by composition of the P elementary signatures.

In this configuration, the calculation of an elementary signature is independent of the calculation of any other elementary signature, making it possible to perform modular updates (by sub-area, for example) of the code storage area with an integrity calculation (of an elementary signature) restricted to the modified sub-areas. In this way the calculation costs may be substantially reduced.

In specific embodiments of the invention, the composition of the P elementary signatures comprises the application of a bijective function.

This may be a function of the exclusive OR type (XOR), for example. This function can be used to avoid a constraint on the order of the sub-areas for the calculation of the signature by composition of the elementary signatures. Thus the external device and the secure element may assign portions of data to be loaded in different ways to the sub-areas forming the code storage area.

In specific embodiments of the invention, the calculation of the signature comprises a composition of the P elementary signatures in a predefined order of their corresponding sub-areas. This order may, for example, be determined by the identifiers belonging to the sub-areas or to the content of these sub-areas (i.e. the set of bits of the sub-area, sometimes called a module), for example an increasing or decreasing order of the identifiers.

In specific embodiments of the invention, the data comprise a script for the execution by the secure element of a step of loading data received from the external device into part of the code storage area, a step of calculating a signature for the whole code storage area when the received data have been loaded, and a step of verifying the calculated signature using a signature received from the external device, for the purpose of enabling the execution of the content of the code storage area solely if these two signatures are identical. In specific embodiments of the invention, the code storage area comprises software elements before the loading of the data (obtained by the external device and received from the external device by the secure element).

Thus the simulated image of the code storage area after loading takes into account the data that may have been loaded previously into the code storage area, in its initial state (the aforementioned binary pattern) or during the operation of the secure element.

In specific embodiments of the invention, the data to be loaded into the code storage area represent only a part of the available space in the code storage area.

For example, the data (the set of code blocks) to be loaded may occupy only a half or a quarter of the bits forming the code storage area. A third aspect of the invention concerns a device for securing the loading of data into a nonvolatile memory of a secure element, said nonvolatile memory comprising a storage area, called the code storage area, defined by an initial program of the secure element, and any modification is controlled solely by said initial program, said device being external to the secure element and comprising:

a module for obtaining data to be transmitted to the secure element;

a module for simulating an image of the code storage area modified by the loading of the data obtained into this code storage area of the secure element;

a module for calculating a signature of the simulated image of the code storage area as a whole; and a module for transmitting the data obtained and the calculated signature to said secure element.

In specific embodiments, the different steps of the aforesaid methods are determined by instructions in computer programs.

Consequently, the invention also proposes a computer program on a data medium, this program being executable by a microprocessor, the program comprising instructions suitable for the execution of the steps of the methods as mentioned above. It is, for example, an initial program such as that mentioned above.

This program may use any programming language, and may be in the form of source code, object code, or a code intermediate between source and object code, such as a code in partially compiled form, or any other desirable form.

The invention also proposes a microprocessor-readable data medium comprising instructions of a computer program as mentioned above.

The data medium may be any entity or device capable of storing the program. For example, the medium may comprise a storage means such as a ROM, for example a microcircuit ROM, or a magnetic recording means such as a hard disk or a flash memory.

On the other hand, the data medium may be a transmissible medium such as an electrical or optical signal which may be routed via an electrical or optical cable, by radio or by other means. The program according to the invention may, in particular, be downloaded from a storage platform of a network such as the internet.

Alternatively, the data medium may be an integrated circuit in which the program is incorporated, the circuit being adapted to execute the method in question or to be used in its execution.

A fourth aspect of the invention concerns a secure element comprising a microprocessor and comprising, in memory, an initial program such as that mentioned above. The secure element conforms, for example, to the ISO/IEC 7816 standard, to the Common Criteria standard, and/or to the GlobalPlatform Card Specification v. 2.2.1 standard.

A fifth aspect of the invention concerns a system comprising a secure element of this kind and a securing device as mentioned above, the external device for the secure element being the securing device.

The particular advantages, objects and characteristics of the aforementioned securing device, secure element, system, data medium and computer program are similar to those of the methods that they execute.

BRIEF DESCRIPTION OF THE DRAWINGS

Other distinctive features and advantages of the invention will be apparent from the following description, illustrated by the appended drawings which show exemplary embodiments of the invention which are not limiting in any way. In the drawings.

FIG. 3 is composed of FIGS. 3a and 3b, showing the main steps of securing methods according to some embodiments, in the form of flow diagrams.

DETAILED DESCRIPTION OF THE INVENTION

In general terms the invention concerns the securing of the loading of data obtained from an external device into a nonvolatile memory of a secure element, and particularly into a storage area called the code storage area, defined by an initial program of the secure element, any modification of this area being controlled solely by this initial program, and the area being capable of containing compiled or interpreted code.

The term "compiled or interpreted code" signifies any set of data containing a program and identified as such by the system (the secure element in this case), and notably a program in machine language, whose instructions or code words (bytecodes or binary) are executed directly by the system's processor.

As mentioned above, the code storage area, and notably its size, is controlled by an initial or "base" program of the secure element. It should be noted that the initial program usually takes the form of a proprietary operating system of the manufacturer of the system, in this case the secure element, this specific operating system operating independently of the code storage area subject to securing according to the invention.

According to the present invention, if an external device obtains data for transmission to the secure element, for example at the request of the latter, because these data are typically made available by the external device (sometimes called an updating device), the external device simulates an image of the code storage area of the secure element as it would be modified by the full loading of the data in question. An "image" of a storage area defines the value and location of each bit in this storage area. A signature is then calculated on the basis of this simulated image, and then sent to the secure element with said data.

This signature is then used by the secure element to verify that code storage area in its entirety is intact after the data loading has been completed. This is because this code storage area is considered to be identical to the image simulated by the external device. Thus, according to the invention, the initial program of the secure element also calculates a signature over the whole of the code storage area after the full loading of any data that have been requested, in order to compare it with the received signature.

The identity between the signatures calculated, respectively, by the external device over the expected (simulated) image of the code storage area after the loading of the data in question, and by the initial program of the secure element over the storage area after the completion of the loading of the data in question thus provides an assurance that the code storage area does indeed conform to the image simulated by the external device, and is therefore intact.

Figure 1A:
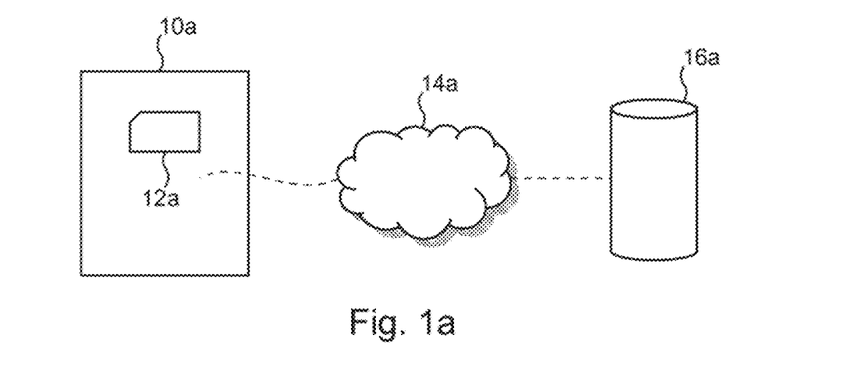
FIGS. 1a and 1b show examples of the context of the use of some embodiments.
Figure 1B:
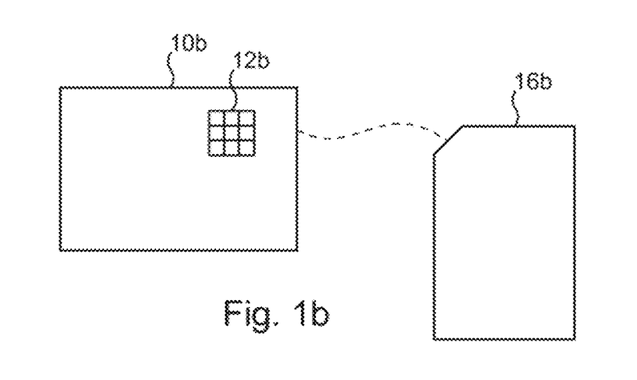

FIGS. 1a and 1b are schematic illustrations of examples of the context of the use of some embodiments.

In FIG. 1a, a secure element 12a, integrated or embedded in a host device 10a, is configured to exchange data with an external device 16a.

The secure element 12a conforms, for example, to the ISO/IEC 7816 standard, to the Common Criteria standard, and/or to the GlobalPlatform Card Specification v. 2.2.1 standard.

The secure element 12a is, for example, an identification module of a subscriber to a network 14a, such as a SIM card or UICC card. The host device 10a is, for example, a mobile terminal, notably an intelligent mobile telephone, known as a "smartphone". The external device 16a is a server (for updates) connected to the network 14a.

The network 14a is, for example, a mobile network supporting data and/or internet communications. Thus, in this exemplary context, the mobile terminal 10a and the server 16b communicate via the network 14a, using the identification module 12a.

FIG. 1b shows another context of the use of some embodiments, in which a secure element 12b of a card 10b, notably a bank card or electronic access card, is configured to exchange data with an external device 16b.

In this example, the secure element 12b comprises means for communication according to the near field communications (NFC) protocol, of the RFID tag type, and the external device 16b is a card reader, also capable of communicating according to the NFC protocol, of the RFID reader type.

In a variant, the secure element and the external device may communicate via Bluetooth or by infrared transmission.

The contexts shown in FIGS. 1a and 1b are not incompatible. Characteristics shown in one context may be provided in the other. Thus the invention is not limited to the contexts described above. For example, the invention may also be advantageously used in a context in which a secure element is embedded or integrated in a host device equipped with means for communication according to the NFC protocol, with an external device which is itself equipped with similar communication means. The embedded or integrated secure element may also comprise means for communication according to the NFC protocol, used to communicate with the host device.

According to some embodiments of the invention, the secure element sends a request to obtain data (for example, an application or part of an application, notably an update) to the external device. In response to this request, the external device sends the requested data to the secure element, for example via the host device in which the secure element is integrated or embedded. These data may or may not be sensitive; that is to say, they may allow a user's data to be manipulated, for example, during their execution.

These data are intended to be stored in (loaded into) a part of the nonvolatile memory of the secure element called the code storage area, defined by an initial program of the secure element, any modification of this area being controlled solely by this initial program, the area being capable of containing compiled or interpreted code.

A signature calculated by the external device is sent with the requested data. According to the invention, this signature has the distinctive feature of reflecting an image of the whole of the code storage area as it should be after the full loading of the requested data.

Preferably, the code area is "randomized" before any initial data loading. In other words, random values are recorded in a random manner in the code area. This state of the code area is known by the external device, so that it can calculate a signature reflecting an image of the whole of the code storage area as it should be after the full loading of the data.

When the loading of the requested data is complete, the initial program of the secure element itself calculates a signature over the code storage area as it has actually been modified by the loading of the requested data, in order to ensure that the whole of the code storage area does indeed have the expected appearance, or in other words is intact.

Figure 2:
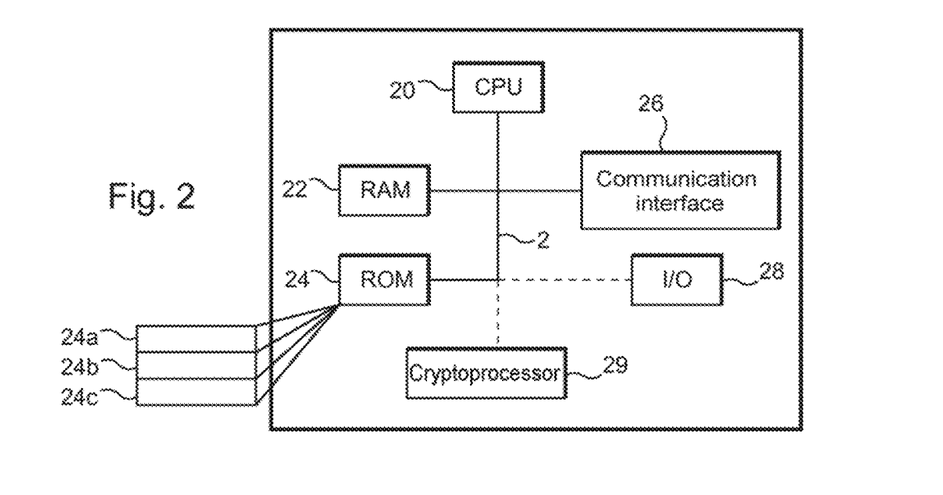
FIG. 2 shows an exemplary architecture of the devices shown in FIGS. 1a and 1b.

FIG. 2 shows an exemplary architecture for the devices shown in FIG. 1a or 1b, that is to say the secure element 12a or 12b, the external device 16a or 16b, and/or the host device 10a or 10b.

According to this architecture, a device may comprise a communication bus 2 connected to the following elements:
a processing unit 20, denoted CPU (Central Processing Unit), which may comprise one or more processors;
a read/write memory 22 or cache memory or volatile memory, for example a RAM (Random Access Memory);
one or more nonvolatile memories 24; and
a communication interface 26.

The read/write memory 22 comprises register suitable for recording the variables and parameters created and modified during the execution of a computer program comprising instructions for using the methods according to the invention during its use. The instruction codes of the program stored in the nonvolatile memory are loaded into the RAM for execution by the processing unit CPU.

The nonvolatile memory or memories 24 are, for example, rewritable memories of the EEPROM or flash memory type, which may constitute a medium in the sense of the invention; that is to say, they may comprise a computer program comprising instruction for the use of the methods according to the invention.

According to the invention, in the case of the secure element, the ROM 24 may, for example, be divided into three storage areas 24a, 24b, 24c. The storage area 24a comprises, for example, the user data such as Java applications (known as "applets"), configuration data of a JavaCard virtual machine, passwords, telephone numbers, applications, or miscellaneous customization parameters.

The storage area 24b is the aforementioned code storage area and is thus dedicated to the storage of data and programs in compiled or interpreted code, for example an operating system of the secure element or any type of application in compiled or interpreted code. It is, for example, a JavaCard virtual machine, a JavaCard execution environment ("JavaCard Runtime Execution" in English), native applications, or the GMS platform ("Global System for Mobile Communications" framework). In order to prevent execution errors, this storage area cannot be modified during the execution of the compiled or interpreted code that it contains. This locking of the storage area 24b is provided by the initial program of the secure element, which is the only program that can make modifications to the code storage area 24b after this area has been temporarily deactivated.

In its initial state, that is to say during manufacture, the storage area 24b is blank. A binary pattern is applied to the storage area 24b in its initial state before any compiled or interpreted code is loaded or installed. This pattern consists, for example, of bits all equal to zero or all equal to one. In a variant, this pattern may consist of some zero bits and some one bits, thus making the image of the bits of the storage area 24b in its initial state more complex, and improving the security of this storage area. Notably, a randomized image as mentioned above may be used.

This initial image is known, notably, by the external updating device 16a/16b, enabling this device to follow precisely the changes in the bits of the storage area 24b, and therefore the changes in the image of this storage area 24b consisting of the set of bits of the storage area 24b, as new software elements in compiled or interpreted code are loaded into the storage area.

The non-modifiable storage area 24c comprises the initial program of the secure element, configured to control the size and integrity of the code storage area 24b, according to the invention. The initial program fixes the size of the code storage area 24b, for example by defining a memory address of the start of the area 24b and a memory address of the end of the area 24b. These addresses are stored, for example, in register keys of the initial program.

The initial program also controls the activation and deactivation of the software elements in interpreted code in the code storage area 24b. In other words, it is only the initial program that can enable or prohibit the execution of compiled or interpreted code stored in the storage area 24b. Notably, it deactivates any execution in the storage area 24b if one of the software elements has to be updated or if new data have to be loaded into it.

The initial program also comprises mechanisms for updating the code storage area 24b, these mechanisms being configured to execute update commands or scripts for loading binary blocks in interpreted code into this code storage area 24b.

The ROM may be divided into more than three areas, all the software elements in compiled or interpreted code of the secure element being nevertheless compulsorily stored in the dedicated code storage area 24b.

The communication interface 26 is adapted to transmit and receive data, for example via a telecommunications network or a read/write interface. For example, it is via this interface that the external device and the secure element send and receive data and their signature. It is also via this interface that the host device can transmit the request from the secure element to obtain data, and can receive these data from the external device to be sent to the secure element.

Optionally, this architecture (typically for the host device 10a) also comprises an input/output interface denoted I/O (Input/Output), for example a screen, a keyboard, a mouse or other pointing device such as a touch screen. By means of this interface, for example, a user can request an update of an operating system or an application in compiled or interpreted code already in memory, or the loading of a new operating system or a new application in compiled or interpreted code.

Optionally, this architecture (typically for the external device 16a or 16b, and the secure element 12a or 12b) also comprises a cryptoprocessor 29 receiving instructions from the processing unit 20 for encrypting/decrypting messages, including for example a signature or data of the executable file in compiled or interpreted code. This encryption secures the transmission of the data and signatures over the network 14a.

The communication bus provides communication and interoperability between the different elements included in the device or connected to it. The representation of the bus is not limiting, and, notably, the processing unit can communicate instructions to any element of the device directly or via another element of this device.

Figure 3A:
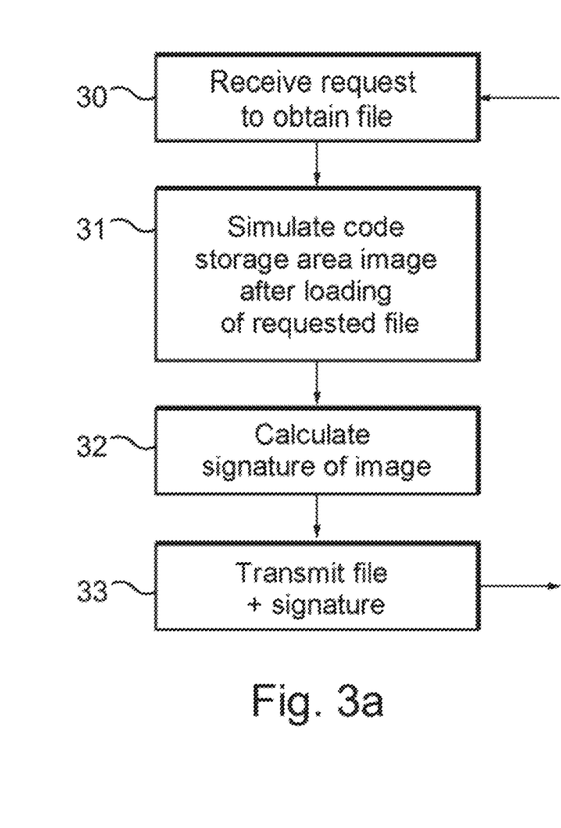
Figure 3B:
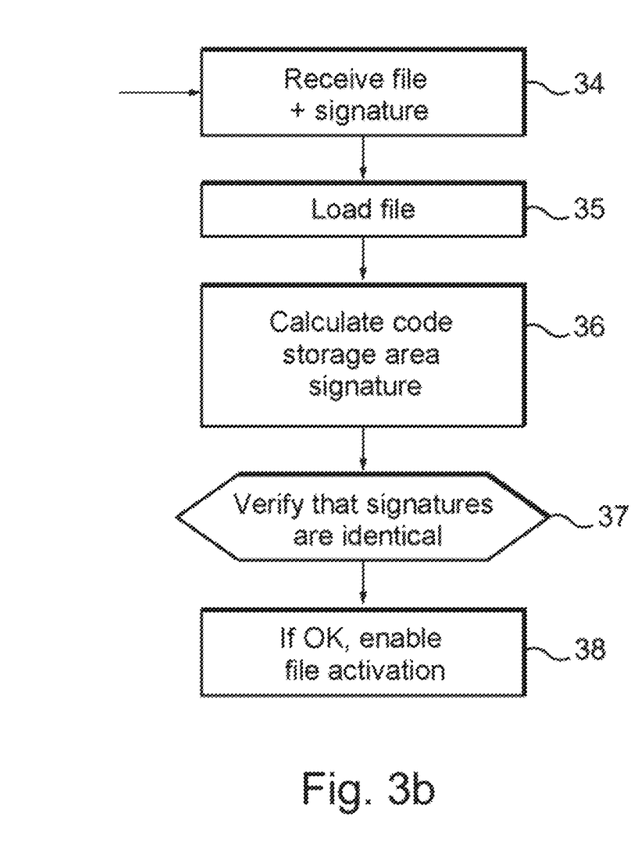

FIG. 3a shows the main steps of a securing method according to some embodiments, these steps being executed by an external device (e.g. the device 16a or 16b of FIG. 1). FIG. 3b shows the main steps of a securing method according to some embodiments, these steps being executed by a secure element (e.g. the secure element 12a or 12b of FIG. 1), notably by the initial program or a loading module provided in the initial program.

In FIG. 3a, in a step 30, the external device receives a request to obtain data, sent by the secure element.

There are a number of feasible mechanisms for sending the request, some of them automatic and others being based on the spontaneous actions of a user.

By way of non-limiting example, and as described previously with reference to FIG. 2, a user of a host device, for example the mobile terminal 10a of FIG. 1a, launches the generation and sending of this request. For example, the user may, by using a keypad or touch screen of the mobile terminal 10a, request the mobile terminal to check whether the external update device holds a more recent version of an application or an operating system than that currently installed in the SIM card placed in the mobile terminal. In this context, the mobile terminal 10a interrogates the secure element in order to discover the present version of this operating system or application, for example by using the "Select(Program)" command (where Program is the operating system or application to be checked) and the "GetData (9F7Fh)" command, where 9F7Fh is a parameter characterizing the traceability data, for example data known as the "Card Production Life Cycle", and then transmits this information to the external updating device so that it can be informed, in return, of the presence or otherwise of a more recent version, for example in a spontaneous manner by using a PING command.

In a variant, the version verification, using the same exchanges, may be automatic at the time of starting of the terminal.

In another variant, the external device may spontaneously inform the terminal and the secure element, by a push mechanism, of the presence of a new version of an operating system or an application.

Having been informed by the updating device of the presence of a more recent version, the terminal transmits this information to the secure element, which can then send the request to obtain the more recent version (that is to say, an update) of all or part of the code of the operating system or application.

Alternatively, the communications between the secure element and the external device are direct for the whole of the description below. Thus the terminal transmits the data and messages exchanged (notably the information that an update is available) without interpreting them, simply acting as a relay.

In some embodiments, this request to obtain comprises information for identifying the secure element, for example a unique identifier of the secure element. This unique identifier makes it possible, for example, for the updating device to use an associated database to retrieve the current or "present" software configuration of the secure element, and notably that of the code storage area 24*b*. In fact, a database of this kind may be used to store the log of the installations and the updates performed on the secure element, as well as an indication of the execution of these installations and updates. This indication is, for example, an installation script indicating the memory addresses or storage locations of the data to be loaded.

In a variant, the request to obtain comprises an identifier of the present software configuration of the code storage area 24*b* of the secure element.

This identifier is, for example, a unique identifier of the software configuration with which the log of the loadings performed into the storage area 24*b* of the secure element is associated in a database associated with the external device.

Because of this identifier, and the associated log, it is possible to know not only the software elements currently stored in the storage area 24*b*, but also those loaded previously and deleted since, together with the order in which these software elements followed each other within the code storage area 24*b*.

Because of this log, it is possible to retrieve all the items of information that followed each other at the different locations of the code storage area 24*b*, particularly at each bit of the storage area 24*b* considered as a whole. Thus the software configuration identified by this unique identifier is representative of the current image of the code storage area 24*b* of the secure element, that is to say the value and location of each of the bits, taking into account, notably, software elements historically loaded but since deleted, although not overwritten (so that they are still in memory).

By way of example, this software configuration identifier may be determined from CPLC (Card Production Life Cycle) data that are retrieved from the secure element, and that may be transmitted regularly to the external device by means of a PING command. The CPLC data comprise, notably, an identifier of the manufacturer of the secure element, the type of secure element, an identifier of the operating system, and the present version of the latter. They enable the external device to retrieve the current image of the code storage area 24*b* of the secure element from which this information was retrieved.

In a variant, the request to obtain may comprise the necessary information for the reconstruction of an image of the storage area, without recourse to the retrieval of supplementary data in an associated database.

In a step 31, the external device retrieves the requested data (from an internal storage area or from a third-party device, for example), and then simulates an image of the bits of the code storage area 24*b* as they should be after the loading of the requested data. In other words, the external device simulates the location and value of each of the bits of the code storage area 24*b*, as they would or would not be modified by the loading of the compiled or interpreted code constituting the requested data.

The loading of the requested data may, notably, follow an installation or loading script (possibly generated by the external device), received by the secure element, and comprising a set of commands defining specific locations for all or some of the requested data. By way of example, the installation script may include an ALV ("address-length-value") indicating the locations (memory address and length) where the data are to be stored (value). Thus the external device is capable of reproducing, by simulation, the installation or loading of the requested data in a way that is identical to the way in which the secure element will act on receipt of the installation script.

Thus the simulated image allows for the bits that will be modified by the loading of the requested data, as well as those that will not be modified by this loading.

In practice, an installation script produced by the external device may comprise a set of commands for modifying the content of the code storage area 24*b*, for example its size, for extending or reducing the capacity for storage of compiled or interpreted code, and/or the installation parameters (the aforementioned ALV file) for the requested data, thus enabling each data bit to be loaded to a precise location (i.e. a precise address) in the code storage area. The external device may thus give one location priority over another for each data bit, for example for the purpose of replacing the bits of a former version of a software element with the bits of the new version of this software element.

Although the installation script is presented separately from the data to be loaded, the latter may form an integral part of the installation script. Thus the script may include one or more blocks, or even the whole of the compiled or interpreted code forming the data, in the values of the aforementioned ALV file.

Furthermore, the installation script may include control signals for establishing a secure channel between the host terminal and the secure element, and may provide for their mutual authentication. By way of example, these commands conform to the GP 2.2.1 Amd D v1.1 (SCP03) specification, so that a secure channel based on session keys generated on the basis of a pseudorandom value (typically based on an identifier of the CPLC data above) is used during the loading of the requested data. The secure channel established according to this specification has the advantage of allowing the pre-generation of a series of commands for transmitting the aforementioned elements (signature, compiled or interpreted code blocks, etc.), notably a "Store Data" command for each entry of the ALV file.

In a step 32, a signature of the simulated image of the set of bits of the code storage area 24*b* is then calculated by the external device. This signature is a function of the new value of the bits modified by the loading of the requested data, as well as the value of the bits of the code storage area that are situated outside the locations modified by this loading. The latter locations may contain the interpreted code of other data (software elements) loaded previously, or the initial binary pattern, that is to say the pattern corresponding to the image of the bits of the code storage area in its initial state, i.e. when it is blank.

It should be noted that, between any previous loading and the actual loading of the requested data into the code storage area 24*b* of the secure element, the bits situated outside the modified locations must not have undergone any modification of location or value with respect to the code storage area. These modifications, being abnormal (malicious, or the result of a logical error in the execution of the loading script), would cause a modification of a signature (described below) of the code storage area 24*b* calculated by the secure element, relative to the expected value, calculated over the simulated image of the storage area 24*b* and characterizing an image of the storage area not having any such modifications.

In practice, this signature is, for example, a message authentication code MAC (Message Authentication Code), a Hash-MAC, the result of a hash function of the SHA-2 type for example, or alternatively the result of the application of a cyclic redundancy code. The signature may be calculated over the simulated image of the bits of a single code block, or over binary portions into which the simulated image of the bits of the whole storage area 24b is divided.

In specific embodiments, the external device virtually divides the code storage area into a number P of sub-areas and calculates an elementary signature for each image portion corresponding to one of the P sub-areas. The signature of the image of the whole code storage area is then obtained by composition of the P calculated elementary signatures.

Thus, the external device may advantageously calculate only the elementary signatures corresponding to the sub-areas modified by the loading, and re-use the elementary signatures of the sub-areas that remain unchanged, if these have been calculated previously.

Notably, the external device may control the content of each sub-area considered, that is to say the set of bits (called a module) forming it, independently of the content of the other sub-areas. In other words, the external device may indicate the loading location of some of the requested data within one or more modules, without necessarily indicating how the modules are to be arranged relative to each other in the code storage area 24b.

The composition of the elementary signatures may be carried out using a bijective function applied to the P elementary signatures of the P sub-areas. This makes it unnecessary to take into account any order of the sub-areas (and therefore any order of the corresponding elementary signatures). This bijective function may be a function of a secret shared between the external device and the secure element. Thus the signature of the whole storage area cannot be obtained from the elementary signatures alone, that is to say without any knowledge of the bijective function or of the secret parameter of this function.

For example, an exclusive OR (XOR) may be used, or a MAC code may be calculated over all the elementary signatures.

In a variant, the signature of the image of the whole code storage area may then be obtained by composition of the elementary signatures in a predefined order, for example related to an order of the corresponding sub-areas, or to an order of their content (called a module). This predefined order may be stored in advance as a secret shared between the external device and the secure element. By way of example, the sub-areas may be provided with an identifier (which may change over time) and the order may be the increasing or decreasing order of said sub-area identifiers.

In a step 33, the requested data, with the installation script generated by the external device for establishing a secure channel and loading the requested data, are sent, with the signature calculated in step 32, to the host terminal for the purpose of their execution, that is to say for the purpose of loading the data into the secure element.

In practice, the signature is sent in an encrypted (or encoded) command, to prevent it from being modified or intercepted before it is received by the secure element. In some embodiments, the requested data, the installation script and the signature are all sent in the same encrypted (or encoded) command.

In other embodiments, a request for activation of the data is sent with the signature in an encrypted command.

In practice, the requested data, the signature and if necessary the activation request may be sent by SMS (Over-The-Air), by internet, NFC, Bluetooth, a wire connection or any other communication means controlled by the external device and by the recipient of these elements (i.e. the secure element and/or the host device).

As regards the operations performed by the secure element, it has been mentioned above that a request to obtain data is sent, accompanied by an identifier, to enable the external device to simulate the image of the bits of the whole code storage area 24b of the secure element.

This request to obtain data is usually sent by the initial program stored in the storage area 24c. For example, the initial program has used a command (for example "chmod") to deactivate all the data (operating system and applications) stored in the code storage area 24b, for the purpose of updating the latter or installing new data.

In the following text, it is assumed that it is the initial program (or a loading module of this initial program) that executes the steps described, unless specified otherwise.

As was also mentioned above in relation to the external device, the host terminal receives the installation script, the data to be loaded (which may or may not be included in the script), and the signature calculated by the external device.

The installation script as received is executed by the host terminal, resulting in exchanges with the secure element as described below in relation to FIG. 3b.

In FIG. 3b, relating to the subsequent steps executed by the initial program of the secure element, in a step 34 the secure element receives the requested data in the request to obtain data, together with the signature calculated by the external device in step 32 and, if appropriate, a request for activation of the requested data, sent by the external device in step 33.

In practice, the host terminal executes the installation script resulting in a mutual authentication between the host terminal and the secure element, notably the initial program of the latter, followed by the installation of a secure communication channel between these two entities, the transmission of the requested data, and finally the numeric signature calculated by the external device.

The mutual authentication may, for example, comprise the following steps:

the host terminal sends the initial program an identifier of the terminal IDterm;

the initial program sends a random number R1 to the terminal;

the terminal calculates and transmits an encoded item C1=f(IDterm, R1) to the initial program;

the terminal transmits a random number R2 to the initial program; and the initial program returns an encoded item C2=f(IDterm, R2).

The validation of C1 and C2 by the initial program and the host terminal respectively allows the mutual authentication of these two entities.

The secure channel according to GP 2.2.1 Amd D v1.1 (SCP03) is then implemented, for example by means of a random value and/or a pseudorandom value (based on the random value and the CPLC data) provided in the installation script by the external device.

The data to be loaded and the signature are then sent during the same communication session between the host terminal and the initial program. The data may be transmitted in a monolithic block, or, in a variant, in a plurality of independent blocks, using for example one or more SCP03 "Store Data" commands using the ALV triplets.

It should be noted that the secure loading of the requested data into the secure element from the host terminal may take place independently of the external device, that is to say without the host terminal necessarily being connected to the external device. This is made possible by the installation script transmitted by the external device, which the terminal may execute in a manner decorrelated with its reception, for example on the next restart of the secure element when the initial program takes over this element.

Other commands provided in the installation script may also be transmitted to the secure element for execution, for example commands for reducing or extending the code storage area 24b, and a command for activating the loaded data.

In a step 35, the requested data are then loaded into the code storage area 24b of the secure element, in a monolithic manner or block by block. In practice, the aforesaid installation script is executed by the loader of the initial program, resulting in the loading and installation of the requested data, either by the loading of a monolithic block, or by the progressive loading of successive blocks according to the ALV storage location instructions.

If the code storage area is partitioned into a number P of sub-areas as mentioned above, according to the content of the installation script, a sub-area may be modified by the loading of a block or a plurality of blocks of compiled or interpreted code, forming the data to be loaded. Other sub-areas may be unmodified; that is to say, no loading is carried out into these sub-areas during the present operation of loading the requested data. If the code storage area is partitioned into sub-areas, the memory addresses for the loading of a block may be expressed relative to a starting memory address of a particular sub-area.

The advantage of block-by-block loading is that each block may be loaded independently of the other blocks.

The loading may, for example, consist in directly storing a block at the memory address indicated in the installation script. Thus, during an update of a software element, this type of loading consists in a direct replacement of the block to be updated.

In a variant, the block to be loaded may be queued in a part of the code storage area 24b dedicated to temporary storage (a reserve area, or "spare memory area") before being positioned and stored at the location specified by the installation script.

The loading method (direct or indirect) used by the initial program for updating the code storage area 24b is known by the external device, so that the latter can know the state of the bits of the reserve area forming part of the code storage area 24b. This ensures that the signature calculated at step 32 conforms to the actual changes in the storage area 24b in the secure element.

If the requested data are loaded as a whole (i.e. when the monolithic block is loaded, or all the code blocks are loaded, as the case may be), that is to say when a loading session is terminated (it should be noted that a session may cover a plurality of cycles of switching the secure element on and off), a step (step 36) of calculating a signature is executed by the initial program of the secure element.

As a general rule, this step is similar to step 32 executed by the external device, except that the signature is calculated from the current image of the bits of the whole code storage area, that is to say from the value of the bits of the code storage area 24b when the loading of the requested data is complete.

By contrast with the signature calculated by the external device on the basis of a simulation of the bits of the code storage area as they would, in principle, be modified after the loading of the requested data, the signature calculated by the initial program takes into account all the bits of the code storage area 24b, and therefore any modifications (whether malicious or due to a loading error) that may have been made to the area 24b.

If the signature received in step 34 has resulted from a composition of elementary signatures of sub-areas as described above, elementary signatures are also calculated by the initial program of the secure element in step 36, again after the completed loading of the code blocks for the sub-areas concerned.

Advantageously, each elementary signature may be calculated as soon as the code blocks to be loaded into the corresponding sub-area, if there are any, have been completely loaded.

In this case, the content (also called the module) of the sub-area concerned is identical to that expected by the external device. Thus, there is no need to wait for the full loading of the requested data (and therefore the loading into the other sub-areas) in order to calculate the elementary signature of the sub-area concerned. Consequently, the elementary signatures may be individually calculated during the execution of the data loading script, thus reducing the calculation time of the global signature when the end of loading has been reached.

These elementary signatures are then composed in an identical manner to step 32, that is to say by using a bijective function or a composition in a predefined order according to the composition method used in step 32. The initial program and the external device are configured to execute the same composition. If necessary, they may exchange instructions to agree on a composition method to be executed for the calculation of the signatures.

A signature of the code storage area reflecting the current image of the whole of the code storage area as it actually is after the full loading of the requested data is thus obtained. It therefore incorporates any unexpected modifications that have been made in the code storage area 24b.

In a step 37, the integrity of the code storage area 24b is verified by comparing the signature calculated by the secure element in step 36 with the signature received from the external device in step 34. This is a process of verifying that the whole code storage area does indeed have the expected appearance, that is to say that each code bit of the loaded data has the expected value at the location specified by the external device, and that the other memory bits are intact in terms of both value and location.

If the calculated signature is different, this means that at least one memory bit has been modified (added, deleted or modified) by comparison with the simulation of the code storage area (that is to say, the simulation of the bits of the whole code storage area) produced by the external device. In this case, the initial program of the secure element considers that the code storage area 24b is not intact and therefore does not enable the execution, that is to say it does not activate the data loaded in this way.

The secure element may then signal the anomaly, for example to the external device, which in response may send new data in an attempt to correct the integrity defect (if a code block has been received with errors), or may install a logical rule to prevent the reproduction of this fault if the fault is due to an identified logical malfunction, for example if compiled or interpreted code is recorded permanently in the reserve area when this area should only be used on a one-off basis as a buffer area. In a variant, the signature may be recalculated by the initial program of the secure element and then verified again after a restart of the secure element.

If the signature calculated by the secure element and the signature received from the external device are identical, the initial program of the secure element enables execution, i.e. activates the data loaded in this way (step 38). By way of example, the initial program may execute a mode change command "chmod" to modify the rights in execution (for example "chmod+x").

In various embodiments, the loaded data may be activated (that is to say, made executable) immediately, or the activation may take place only on the next start-up of the secure element. The latter mode has the advantage of not interrupting the operation of the secure element if the data in question correspond to an update of its operating system.

In some embodiments, new steps of signature calculation (step 36) and verification (step 37) are executed during the operation of the secure element (for example, on a periodic basis, independently of the switching off of the secure element) in order to provide continuous verification that the code storage area is still intact. In this way, any malicious modifications of the code storage area that have occurred after the last loading session may be identified. These new integrity verifications may occur whenever the secure element is switched on, at the request of a third party (such as the external device or a network operator), or alternatively on each occurrence of a predetermined event (such as a user request, the expiry of a counter, the receipt of a specific command, or low usage of the processor).

If a lack of integrity of the code storage area 24b is detected, the initial program may decide to deactivate the interpreted code in this storage area and warn the external device. The reactivation of the interpreted code takes place only on the restoration of an entirely intact code storage area 24b.

The above examples are simply a number of embodiments of the invention, which is not limited to them.

For example, as described above, the requested data blocks may be transmitted to the initial program with the aid of "Store Data" commands for each block, and these blocks may then be loaded either directly to the specified memory locations or via temporary storage in a reserve storage area (step 35).

In a variant, the host terminal may transmit a new script, called the update script, to be executed by the initial program, this update script including the various interpreted code blocks of the requested data, together with indications of the specified loading locations. This update script is stored in the reserve storage area of the area 24b, before being executed by the initial program in order to modify the code storage area 24b by the progressive loading of the various interpreted code blocks of the requested data.

Additionally, in the above examples, the secure element sends a request to obtain data (step 30). In variants of the invention, the external device pushes the data toward the secure element by the mechanism known by the term "push", which does not require the aforementioned request. In these variants, the external device knows the loading history for the secure element (by using the aforementioned database, for example), and, for example, if it has a relevant update for the secure element, it is able to simulate the image of the code storage area, calculate the signature (via the elementary signatures if appropriate) and transmit the whole of the data in "push" mode to the secure element.

The invention claimed is:

1. A method of providing verification information from an external device external to a secure element to the secure element to verify whether or not to enable an execution of data at a nonvolatile memory of the secure element, said method comprising the following operations executed by the external device:
obtaining a current image of a code storage area of the nonvolatile memory of the secure element, the code storage area being defined by an initial program of the secure element, the code storage area being modifiable solely by the initial program of the secure element;
obtaining data to be transmitted to the nonvolatile memory of the secure element to be loaded into a part of the code storage area of the nonvolatile memory;
simulating a modified image of the code storage area from the obtained current image of the code storage area, the modified image indicating the code storage area after being modified by the loading of the obtained data into the code storage area of the nonvolatile memory of the secure element;
calculating a signature of the simulated image of the code storage area as a whole; and
transmitting the obtained data and the calculated signature to said secure element to verify at the secure element whether or not to enable the execution of the data loaded into the code storage area of the nonvolatile memory of the secure element by a comparison of the transmitted signature and a signature of the whole code storage area after the obtained data have been loaded at the secure element.

2. The securing method as claimed in claim 1, wherein said data are transmitted to the secure element in response to a request to obtain data, and the request to obtain data comprises the information that identifies the secure element.

3. The securing method as claimed in claim 1, wherein said data are transmitted to the secure element in response to a request to obtain data, and the request to obtain data comprises a unique identifier of a software configuration representative of the current image of the code storage area of the secure element.

4. The securing method as claimed in claim 1, wherein the signature of the simulated image is transmitted to the secure element with a request for activation of the data obtained, in an encrypted command sent from the external device.

5. The securing method as claimed in claim 1, wherein the data are transmitted by the external device with an indication of a location or locations in the code storage area into which the data obtained are to be loaded.

6. The securing method as claimed in claim 1, wherein said code storage area is partitioned into P sub-areas, and the calculating the signature comprises obtaining an elementary signature for each sub-area and obtaining said signature for the whole code storage area, whether simulated or not, by composition of the P elementary signatures.

7. The securing method as claimed in claim 6, wherein the composition of the P elementary signatures comprises the application of a bijective function.

8. The securing method as claimed in claim 6, wherein the calculation of the signature comprises a composition of the P elementary signatures in a predefined order of their corresponding sub-areas.

9. The securing method as claimed in claim 1, wherein said data comprises a script for the execution by the secure element of loading data received from the external device into part of the code storage area, calculating the signature for the whole code storage area when the received data have been loaded, and verifying the calculated signature using the whole code storage area signature received from the external device, to enable the execution of the content of the code storage area solely when the two signatures are identical.

10. The securing method as claimed in claim 1, wherein said code storage area comprises software elements before the loading of said data.

11. The securing method as claimed in claim 1, wherein said data to be loaded into the code storage area represents only a part of the available space in the code storage area.

12. A non-transitory computer-readable medium including instructions to cause a microprocessor to execute a method comprising instructions of an initial program for the execution of the following operations, when the medium is loaded and executed by the microprocessor of a secure element comprising a nonvolatile memory that includes a code storage area, the method comprising:
receiving data and a signature of a simulated image of the nonvolatile memory of the secure element from an external device external to a secure element, the simulated image indicating a code storage area of the nonvolatile memory after being modified by the loading of the data, the code storage area being defined by an initial program of the secure element, the code storage area being modifiable solely by the initial program of the secure element;
loading the data received from the external device into a part of the code storage area of the nonvolatile memory;
calculating a signature of the whole code storage area after the data have been loaded; and
verifying the calculated signature, using the received signature, in order to enable an execution of the data loaded into the code storage area solely when the calculated signature is identical to the received signature.

13. A secure element comprising a microprocessor and comprising, in memory, the initial program as claimed in claim 12.

14. An external device external to a secure element for providing verification information to the secure element to verify whether or not to enable an execution of data at a nonvolatile memory of the secure element, the external device comprising:
a processor configured to:
obtain a current image of a code storage area of the nonvolatile memory of the secure element, the code storage area being defined by an initial program of the secure element, the code storage area being modifiable solely by the initial program of the secure element;
obtain data to be transmitted to the nonvolatile memory of the secure element to be loaded into a part of the code storage area of the nonvolatile memory;
simulate a modified image of the code storage area from the obtained current image of the code storage area, the modified image indicating the code storage area after being modified by the loading of the obtained data into the code storage area of the nonvolatile memory of the secure element;
calculate a signature of the simulated image of the code storage area as a whole; and
transmit the obtained data and the calculated signature to said secure element to verify at the secure element whether or not to enable the execution of the data loaded into the code storage area of the nonvolatile memory of the secure element by a comparison of the transmitted signature and a signature of the whole code storage area after the obtained data have been loaded at the secure element.

15. A system comprising:
a secure element according to claim 13; and
a securing device external to the secure element, the securing device comprising a processor configured to:
obtain a current image of a code storage area of the nonvolatile memory of the secure element, the code storage area being defined by an initial program of the secure element, the code storage area being modifiable solely by the initial program of the secure element;
obtain data to be transmitted to the nonvolatile memory of the secure element to be loaded into a part of the code storage area of the nonvolatile memory;
simulate a modified image of the code storage area from the obtained current image of the code storage area, the modified image indicating the code storage area after being modified by the loading of the obtained data into the code storage area of the nonvolatile memory of the secure element;
calculate a signature of the simulated image of the code storage area as a whole; and
transmit the obtained data and the calculated signature to said secure element to verify at the secure element whether or not to enable the execution of the data loaded into the code storage area of the nonvolatile memory of the secure element by a comparison of the transmitted signature and a signature of the whole code storage area after the obtained data have been loaded at the secure element.

16. A method of verifying whether or not to enable an execution of data at a nonvolatile memory of a secure element, said method comprising operations executed by the secure element:
receiving data and a signature of a simulated image of the nonvolatile memory of the secure element from an external device external to a secure element, the simulated image indicating a code storage area of the nonvolatile memory after being modified by the loading of the data, the code storage area being defined by an initial program of the secure element, the code storage area being modifiable solely by the initial program of the secure element;
loading the data received from the external device into a part of the code storage area of the nonvolatile memory;
calculating a signature of the whole code storage area after the data have been loaded; and
verifying the calculated signature, using the received signature, in order to enable an execution of the data loaded into the code storage area solely when the calculated signature is identical to the received signature.

17. The securing method as claimed in claim 16, wherein said data are transmitted to the secure element in response to a request to obtain data, and the request to obtain data comprises the information that identifies the secure element.

18. The securing method as claimed in claim 16, wherein said data are transmitted to the secure element in response to a request to obtain data, and the request to obtain data comprises a unique identifier of a software configuration representative of the current image of the code storage area of the secure element.

19. The securing method as claimed in claim 16, wherein the signature of the simulated image is transmitted to the secure element with a request for activation of the data obtained, in an encrypted command sent from the external device.

20. The securing method as claimed in claim 16, wherein the data are transmitted by the external device with an indication of a location or locations in the code storage area into which the data obtained are to be loaded.

\* \* \* \* \*